United States Patent
Cheuk et al.

(10) Patent No.: US 6,410,079 B2
(45) Date of Patent: *Jun. 25, 2002

(54) HIGH MEAT PET FOOD COMPOSITIONS

(75) Inventors: Wai Lun Cheuk; Larry Harland Hayward; Peter Laisui Thawnghmung, all of Topeka, KS (US)

(73) Assignee: Hill's Pet Nutrition, Inc., Topeka, KS (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/473,106

(22) Filed: Dec. 28, 1999

(51) Int. Cl.⁷ .............................................. A23L 1/314
(52) U.S. Cl. ........................ 426/641; 426/657; 426/807
(58) Field of Search ................................ 426/641, 657, 426/807

(56) References Cited

U.S. PATENT DOCUMENTS 3,973,051 A * 8/1976 Buckley et al. ............. 426/574
3,982,003 A * 9/1976 Mitchell et al. ................ 426/1
4,018,935 A * 4/1977 Catlin et al. ................ 426/646
4,791,002 A * 12/1988 Baker et al. ................ 426/641
4,892,748 A * 1/1990 Andersen et al. .......... 426/635

OTHER PUBLICATIONS

Megard et al, Continuous Restructuring of Mechanically Deboned Chicken Meat by HTST Extrusion Cooking, Journal of Food Science, vol. 50, 1985, pp. 1364–1369.

Cheftel et al, New Protein Texturization Process by Extrusion Cooking at High Moisture Levels, Food Reviews International, 8(2), 1992, pp. 235–275.

Roussel, Making Meat Products Using Extrusion Technology, Extrusion Communiques, Nov.–Dec. 1996, pp. 16–18.

* cited by examiner

Primary Examiner—Chhaya D. Sayala
(74) Attorney, Agent, or Firm—Martin B. Barancik

(57) ABSTRACT

A pet diet composition comprising at least about 40 wt. % meat and cellulosic material in quantities effective to allow extrusion and cutting of the composition post extruder.

14 Claims, No Drawings

HIGH MEAT PET FOOD COMPOSITIONS

BACKGROUND OF THE INVENTION

Pet diets, particularly dog and cat food diets, strive to be highly nutritional. In doing so these diets, both dry and wet, utilize nutritionally appropriate materials in the proper balance. However, these materials often differ from the natural diet of carnivorous mammals such as dogs and cats. Generally the meat content of these pet foods, particularly in dry diets, is no more than about 25 to 30 wt % of the diet. Diets having more meat are potentially advantageous due to such parameters as appearance, palatability and overall acceptability to the pet. However, such meat quantities are not normally found in pet diets because the standard method of manufacturing these diets, extrusions followed by cutting into chunks and/or particles with standard knife blades, cannot prepare a diet with substantially higher meat content, for example, a meat content minimum of about 40 or 45 wt % of the composition. Although not wishing to be bound by this theory, it is thought that the higher water content accompanying the higher meat content makes the diet difficult to form in the extruder as well as essentially noncuttable at an economically attractive rate by the standard knives post extruder.

It has now been discovered that the problems can be seriously ameliorated or solved by adding cellulose or cellulose-like material to the diet. The presence of this material(s) permits standard extrusion and cutting apparatus to manufacture a diet having a minimum of about 40 to 45 wt % meat content. This discovery is particularly advantageous since it eliminates the necessity of having expensive meat chunk forming and processing equipment available for processing. Additionally, it also adds a nutritious material to the diet as well.

SUMMARY OF THE INVENTION

In accordance with the invention, there is a pet diet composition comprising at least about 40 wt % meat with cellulosic material in quantities effective to allow extrusion and cutting of the composition post extruder, the composition having the said meat wt % minimum in the extruder.

A further aspect of the composition is a process for producing a pet diet composition having at least about 40 wt % meat which comprises extruding and post extrusion cutting the composition having the said wt % meat minimum wherein the composition has cellulosic material in quantities sufficient to allow effective extrusion and post extrusion cutting of the composition.

DETAILED DESCRIPTION OF THE INVENTION

The usual method of making pet foods, particularly for dogs and cats, is generally well-known. For dry diets, components are combined in a preconditioner and then fed into an extruder where they are mixed, heated (cooked) and expanded. The extrudate is then emitted from the extruder and cut using standard knife blades, into the proper sized particles for packaging. These diet components include meat, grain, carbohydrate, various adjuvants such as vitamins and minerals, as well as moisture and the like. Wet diets are prepared in the same manner and the meaty "chunk" that is chunk or slice which is a discrete meaty particle which is added to a liquid gravy for packaging is prepared in the extruder and sliced or further treated to obtain the desired size prior to mixing with the gravy.

Meat is meant to include any proteinaceous material obtained from an animal source. Meat includes beef, pork, lamb, fish, chicken, turkey, veal, and the like and mixtures thereof. In accordance with the teaching of this invention, meat can now be at least about 40 wt % of the dry pet diet composition, particularly that for dogs and cats. Desirably it can be more than about 45 or 50 wt %. The upper limit of meat in the dry diet depends upon the nutritional needs met by the components of the diet as well as the quantity of cellulosic materials present in the diet, the palatability of the diet and the processability of the diet as well as the diet cost. Generally quantities above about 65 wt % are not employed, desirably about 60, 55 or 50 wt % can be a maximum. When used in a wet diet, the meat in the "chunk" itself is at least about 40, 45 or 50 wt % of the chunk with 65, 60, 55 or 50 wt % of the "chunk" being the maximum.

The cellulosic fibrous component used in the diet is cellulose fiber and other plant fibers or fibrous microbial polysaccharides. Examples of such latter materials include hemicellulose, lignins and other pectic substances found naturally in the supporting structure of seed-bearing plants. The particle size of these materials can be those as normally manufactured that is in the powder form or larger. Although they can be smaller, these particles generally have minimum particle sizes of at least about 5 microns, desirably at least about 10 microns and more desirably at least about 20 microns. The maximum size is that which can be reasonably processed and bring about the processability of the increased meat in the diet composition. Generally a particle size of about 5000 microns need not be exceeded, desirably about 2000 or 1000 microns need not be exceeded. The quantity of cellulosic fiber content is an amount sufficient to bring about extrudability of a formed composition and cutting of that composition post extruder with standard knife equipment, the composition having a minimum of about 40 wt % meat content. Generally the minimum of cellulosic fiber is about 5 or 6 wt % of the diet composition, desirably a minimum of about 7, 8 or 9 wt %. The maximum quantity of cellulosic fiber is the amount compatible with the diet, palatable to the mammal, generally dog or cat, and consistent with the nutritional needs and components of the remainder of the diet. Generally, the maximum does not exceed about 25 wt % of the diet and generally not more than about 20 wt % of the diet.

The invention process is advantageous because ordinary extruder equipment can be employed. Lengthier than usual extruder barrel for retexturization to coagulate protein generally followed by longer land length than normal dies to cool the extrudate are not necessary. Example(s) of such ordinary extruders include commercially manufactured single screw extruders, twin screw extruders such as a Wenger TS-52 twin screw extruders system, Clexpral Bc45 V, Wenger TS-52 twin screw extruders, and the like.

Dry diets, generally those having not more than about 30 wt % water are readily prepared through the inventive process. Such a process prepares an essentially homogeneous strand which is cut by a standard knife. Examples of such knives include rotating die face knife, rotating drum knife, and guillotine knife. This is in contrast to the wet diets of the "chunk and gravy" type where the meat is in discrete "chunks" and post extruder with standard knife equipment, the composition having a minimum of about 40 wt % meat content. Generally the minimum of cellulosic fiber is about 5 or 6 wt % of the diet composition, desirably a minimum of about 7, 8 or 9 wt %. The maximum quantity of cellulosic fiber is the amount compatible with the diet, palatable to the mammal, generally dog or cat, and consistent with the nutritional needs and components of the remainder of the diet. Generally, the maximum does not exceed about 25 wt % of the diet and generally not more than about 20 wt % of the diet.

The invention process is advantageous because ordinary extruder equipment can be employed. Lengthier than usual extruder barrel for retexturization to coagulate protein generally followed by longer land length than normal dies to cool the extrudate are not necessary. Example(s) of such ordinary extruders include commercially manufactured single screw extruders, twin screw extruders such as a Wenger TS-52 twin screw extruders system, Clexpral Bc45 V, Wenger TS-52 twin screw extruders, and the like. Dry diets, generally those having not more than about 30 wt % water are readily prepared through the inventive process. Such a process prepares an essentially homogeneous strand which is cut by a standard knife. Examples of such knives include rotating die face knife, rotating drum knife, and guillotine knife. This is in contrast to the wet diets of the "chunk and gravy" type where the meat is in discrete "chunks" and deployed in a thickened liquid "gravy". Generally the latter wet diet has at least about 35–40 wt % water content.

The chunks of a wet diet can be produced by the method of this invention. Such method has the additional advantage of obviating the usual equipment necessary to make a "chunk". As used herein the term "chunk" is used with respect to any type of meaty particle which is presented to the pet in a discrete form in a gravy type liquid. Such pet food compositions would include chunk and gravy diets, slices that are somewhat elongated, flat discrete particles which have a high percentage of meat, jerky and the like. The process of the invention is now further described.

In general, using a regular extruder such as a Wenger X20 single screw extruder—a meat protein source and a grain mix with vitamins and minerals are incorporated into a preconditioner of the extruder to provide mixing and preconditioning (for example, to slightly steam and moisturize) the formulated meat emulsion. The extruder barrels and screw therein then further mix, heat, coagulate, expand and shear the formulated meat emulsion into meat-like mass which is then formed with different types of die plates for different shape and cut by standard knives for different thickness at the extruder exit.

A raw meat protein source such as beef trim is a meat mix made from either fresh or thawed out frozen meat blocks such as meat or meat by-products. Meat materials can be animal protein muscle or skeletal meats of mammals, fish, poultry or meat by-products such as hearts, livers, lungs, spleen, tongue and the like. The meat protein source is ground through a small grind-plate generally about ⅛ inch and then emulsified to reduce particle size and bone fragments. Sometimes, fat is added as oil or tallow depending on nutrient requirements. The meat protein source is then heated to about 28° C. The meat protein source preferably comprises about 25 to 30% protein with a moisture content ranging from 35 to about 42% moisture by weight and the fat content about 8 to about 12%.

A grain mix with vitamins and minerals comprises proteinaceous materials (for example wheat gluten, soy protein concentrate, dry blood plasma), dry carbohydrate materials (for example potato starch, cellulose or cellulose-like materials), salt, spices, seasonings, vitamins, minerals, flavorants, colorants and the like. The amount of this additive mixture depends on the nutritional requirements for different life stages of an animal based on Association of American Feed Control Official's AAFCO regulations.

These two main components are indexed into the preconditioner at a rate ranging from about 40 to about 52% of the meat protein source, preferably at about 48%. A sufficient amount of steam is injected into the preconditioner to moisten and warm the formulated meat emulsion to facilitate blending with the grain mix. The amount of steam injected is 3–10% by weight of total extruder throughput.

The formulated meat emulsion then enters the extruder which runs at a barrel rpm of about 200 to 450 with an extruder load of about 25 to about 60% of total capacity of the extruder. At such conditions, the meat emulsion is being further mixed, heat coagulated, expanded and sheared to simulate a meat-like texture which can be dependent on the temperature of extruder barrels.

Eventually the extrudate is pressed through a die plate which will give a cross section shape to the strand and then cut by knives at a specific speed for a desired length.

Depending on the varieties of pet food to be made, the extrudate can be formed to make beef jerky type treats, or formed to make high meat dry kibbles or high meat inclusion chunks. These extruded pieces are then allowed to be cooled or dried to different moisture levels. If desired the collected chunks are simply transferred to a canning operation to be filled into cans along with a gravy or sauce to make chunks and gravy products for pet foods.

Below are examples of the invention. These examples are intended to illustrate the broad nature of the invention concept and not unduly limit the invention.

EXAMPLE 1

Jerky Treat Type Product

A meat protein source comprising skeletal muscle from cattle, hog, poultry or fish and their meat by-product is prepared. It consists of 47.5% emulsified meat and meat by-product (the percentage is the total weight of the finished formulations). The meat mix along with 5% liquid molasses and 0.5% of charsol liquid smoke is mixed well and heated to 28° C. to be indexed to the "throat" on top of a preconditioner of an extruder (Wenger X-20). The final meat mix is about 53% of the total formulation.

A grain mix consists of 10% soybean meal , 10% cellulose, 7% wheat flour, 6% wheat gluten, 5% soybean meal run and 1% potato starch. The humectant at 5% consists of dextrose and salt. Potassium sorbate at 0.5% is also added to prevent yeast and mold formation in finished product. The balance of the formula is made up of vitamin and mineral premixes at about 2.5%. These numbers are wt.% of the final formation.

The meat mix and grain mix are indexed into the "throat" of a preconditioner at the following processing conditions:

| | |
|---|---|
| Total throughput | 12.00 lb/min. |
| Meat rate | 6.37 lb/min |
| Grain rate | 5.63 lb/min. |
| Preconditioner | Steam On @ 4.9 lb/min. |
| Preconditioner rpm | 200–220 |
| Extruder rpm | 300–320 |
| Extruder amp | 40–44 |
| Extruder die-plate | ¾" × 5/16" |
| Extruder, rotating die face cutting knives | 1–2 |

The extrudate which has a moisture content about 36–40%, naturally ocurring in grain mix and that additional water added into the preconditioner or extruder barrel is pressed through a die-plate with a single hole and cut into strips by 1 or 2 flying knives depending on the desired length of the strips. The extruded strips are then dried to a final moisture ranges from 20 to 23% moisture with a water activity (Aw) of 0.85. The finished product is shelf stable and can be used as a treat for dogs or cats.

EXAMPLE 2

Dried Kibbles for Dogs and Cats

A meat protein source is prepared similar to Example 1 using emulsified meats and meat by-products from mammals or fish. The meat mix consists of 45% emulsified chicken and 5% emulsified beef liver. The meat mix is further emulsified to reduce particle size and bone fragments. The meat mix is heated to about 28° C. to be indexed into the "throat" of a preconditioner of the extruder (Wenger X-20). The final meat mix is about 50% of the total formula on an "as is" basis.

The grain mix consists of 18% wheat gluten, 4% soy protein concentrate, 7% dried blood plasma, 4% dried egg, 4% potato starch, 7% cellulose as wt. % of the total formulation. Mineral and vitamin premixes make up the balance of the formula.

The meat mix and the grain mix are indexed into the throat of the preconditioner of the extruder at the following processing conditions:

| | |
|---|---|
| Total throughput | 12.00 lb/min. |
| Meat rate | 6.00 lb/min |
| Grain rate | 6.00 lb/min. |
| Preconditioner | Steam on @ 4.9 lb/min. |
| Preconditioner rpm | 200–220 |
| Extruder rpm | 300–320 |
| Extruder amp | 40–44 |
| Extruder die-plate | 0.32" diameter hole |
| Extruder cutting knives | 2–3 |

The preconditioner is full of rising steam indicating the meat and grain mix has maximum temperature and moisture incorporated. The extrudate has a moisture range from 32 to 35%. The extrudate is eventually pressed through a die-plate with a hole of 0.32" diameter, and cut into kibbles with 2 to 3 flying knives at the end of the extruder.

The extrudates are then vacuum-delivered onto a conveyer belt to a dryer, drying to a final moisture about 8 to 10% moisture to maintain product stability. The final kibbles are fed freely to dogs or cats as regular dry pet food.

EXAMPLE 3

Meat Chunks for Chunks & Gravy in Canned Pet Food

A meat protein source is prepared similar to Examples 1 and 2 using emulsified meats and meat by-products from mammals or fish. The meat mix consists of 24% pork liver, 17% pork lungs and 9% chicken fat. The meat mix is emulsified to reduce particle size and bone fragment. The meat mix is heated to about 28° C. to be indexed to the throat of a Preconditioner of an extruder. The final meat mix is about 50% of all chunk ingredients.

A grain mix consists of 19% wheat gluten, 12% cellulose, 4% potato starch, 5% soy protein concentrate, and 4% of dried blood plasma as weight of final formulation. Vitamin and mineral premixes make up the balance of all chunk ingredients (about 6%).

The meat mix and grain mix are indexed into a preconditioner of the extruder at the following processing conditions:

| | |
|---|---|
| Total throughput | 12.00 lb/min. |
| Meat rate | 6.00 lb/min |
| Grain rate | 6.00 lb/min. |
| Preconditioner | Steam on @ 4.9 lb/min. |
| Preconditioner rpm | 200–220 |
| Extruder rpm | 300–320 |
| Extruder amp | 40–44 |
| Extruder die-plate | ¼" × ½" hole |
| Extruder cutting knives | 2–3 |

Steam is added to moisten/heat the meat and grain mix, the extrudate has a moisture range from 36 to 40%. The extrudate is pressed against a die plate with a single hole by 2 flying knives and cut into chunks (about 10 mm size). The chunks have meat striation and expansion resembling a meat-like appearance. The chunks are transferred to a canning operation to make chunk and gravy product.

A gravy is then prepared by mixing together 1% guar gum, 1.5% high fructose corn syrup and water making up the remainder of all gravy ingredients. The chunks and gravy are mixed in a meat chunk and gravy rate of 40:60 by weight. The mixture is then filled into cans. The cans are sealed and sterilized. The sterilized product resembles meat chunks with a sauce suitable for pet consumption.

What is claimed is:

1. A dry pet diet composition comprising
    a. above 50 to about 65 wt. % meat, and
    b. cellulosic material in quantities effective to allow extrusion and cutting of the composition post extender, said material being about 6 to about 20 wt. % of the composition.

2. The composition in accordance with claim 1 wherein the meat maximum is about 60 wt. % of the composition.

3. The composition in accordance with claim 1 wherein the composition is a kibble.

4. The composition in accordance with claim 1 wherein the composition is a jerky.

5. The composition in accordance with claim 1 wherein the material is cellulose.

6. A process for producing a dry pet diet which comprises extruding and cutting a meat containing composition having above 50 to about 65 wt. % meat and cellulosic material in quantities effective to allow extrusion and then cutting of the composition post extruder, said material being about 6 to about 20 wt. % of the composition.

7. The process in accordance with claim 6 wherein the meat maximum is about 60 wt. %.

8. The process in accordance with claim 6 wherein the composition is a kibble.

9. The process in accordance with claim 6 wherein the composition is a jerky.

10. The process in accordance with claim 6 wherein the material is cellulose.

11. A process for producing a wet pet diet in the form of a discrete particle in a liquid which comprises extruding and cutting a meat containing composition containing about 40 to about 65 wt. % meat, and cellulosic material in quantities effective to allow extrusion and then cutting of the composition post extruder, said cellulosic material being about 5 to about 20 wt. % of the composition, and adding a water gravy liquid to the cut composition.

12. The process in accordance with claim 11 wherein the meat is at least about 45 wt. % of the composition.

13. The process in accordance with claim 11 wherein the meat maximum is about 60 wt. % of the composition.

14. The process in accordance with claim 11 wherein the material is cellulose.

* * * * *